UNITED STATES PATENT OFFICE.

EDWARD J. YETTER, OF DENVER, COLORADO.

COMPOSITION FOR ROOFING, PAVING, &c.

No. 819,833.　　　Specification of Letters Patent.　　Patented May 8, 1906.

Application filed April 12, 1904. Serial No. 202,762.

*To all whom it may concern:*

Be it known that I, EDWARD J. YETTER, a citizen of the United States, residing at Denver, in the county of Denver and State of Colorado, have invented certain new and useful Improvements in Compositions for Roofing, Paving, &c.; and I do hereby declare the following to be a full, clear, and exact description of the invention, such as will enable others skilled in the art to which it appertains to make and use the same.

My invention relates to compositions of matter adapted for use in preparing roofing-sheets, sheathing, and paving materials, &c.; and it consists principally in combining with gilsonite the substance known as "lime sludge," with a suitable oil or flux, if necessary, or with asphaltum or other equivalent ingredients. Compositions resulting from such admixtures, which may be of various proportions and combined with other materials, according to the particular purpose in view, are exceedingly efficient and durable, tough, well tempered, sufficiently elastic and pliable, and of inexpensive production, while they form valuable commercial products.

The chief ingredients are gilsonite and lime sludge. Gilsonite, or "uintahite," as it is also called, is a comparatively recent hydrocarbon, a bituminous material, which has been discussed in various publications. (See United States patent to S. H. Gilson, No. 361,759, April 16, 1887, United States patent to E. J. Yetter, No. 633,255, September 10, 1899, and Locke's article in *Transactions of American Institute of Mining Engineers*, Vol. 16, page 162.) As well known, gilsonite possesses valuable properties as the principal ingredient in roofing compositions; but used alone it is unsatisfactory, being too brittle and not adapted as a base which can be tempered to proper consistency, wherefore it is frequently combined with other substances, such as asphaltums and oils.

Lime sludge is a substance found usually as a refuse product of sugar factories, obtained in large quantities in the refining of beet-sugar. It is a calcined limestone which has taken up carbonic acid in the purifying process and is practically a carbonate of lime, which, however, has special physical characteristics particularly adapting it for this composition. This waste product, known as "lime sludge," and sometimes pressed into "lime cakes" and called "lime mud," has no commercial value at the refineries and is therefore not saved by them, but is, on the contrary, a source of annoyance and expense to get rid of. It is thus a very inexpensive ingredient. It has a peculiarly strong affinity for hydrocarbons and readily combines chemically therewith when thoroughly pulverized and mixed. Lime sludge has this strong affinity for gilsonite and when combined therewith in large proportions, together with a suitable oil or flux or other substance to give temper and consistency, produces an inexpensive but commercially valuable composition having many desirable qualities, such as toughness, tenacity, pliability, durability, and comparative immunity from deterioration.

In forming the composition I mix crushed and thoroughly-pulverized lime sludge with molten gilsonite, using also a suitable oil or flux, if necessary, to put the mixture in condition to work or spread. Various proportions of the ingredients may be adopted, in accordance with the purpose in view. Any suitable oil may be used, as maltha, residuum of petroleum-oil, crude petroleum, some of the non-drying vegetable oils, as cotton-seed oil and linseed-oil, or any equivalent. Asphaltum is also found highly valuable in combination with these ingredients either with or without the oil, according to the nature of the asphaltum. Thus where hard asphaltum is used, such as the Trinidad variety, it is desirable to add an oil flux; but in using a soft asphaltum—such as the California, Texas, or other manufactured varieties, which naturally contain oil or have it incorporated in sufficient proportion by the refining process—oil as a distinct ingredient is not necessary. Any equivalent of asphaltum or substance of like nature may also be combined with the other ingredients named. For roofing and sheathing a suitable oil or flux is considered an essential ingredient unless asphaltum or equivalent material is used so tempered with oil that this substance may be omitted as a distinct ingredient.

To any of the compositions referred to, having gilsonite and lime sludge as the chief ingredients, I may also add sand, litharge, infusorial earth, gravel, and other substances useful for roofing and paving compositions. I have found the following admixtures give excellent results:

First. Gilsonite, one hundred pounds;

lime sludge, ninety pounds. This admixture makes a comparatively hard substance adapted for roofing or paving blocks, &c.

Second. Gilsonite, one hundred pounds; lime sludge, ninety pounds; oil, one hundred pounds.

Third. Gilsonite, one hundred pounds; lime sludge, ninety pounds; asphaltum, one hundred pounds; oil, one hundred and seventy pounds. These two latter compositions are especially adapted for roofing and other coatings and may be applied in liquid form for saturating and coating burlap, muslin, paper, or other fabrics for making roofing-sheets, floor-coverings, linings, and similar articles. They may also be tempered by heat or slight changes in the combinations or by the use of different kinds of gilsonite or asphaltum or made into harder preparations, which may also be used for sidewalk and paving cement. It will be understood, however, that I am not limited to any specific proportions, since these may be varied as found desirable on account either of the particular materials employed or the purpose or effect in view. Asphaltums and gilsonites vary more or less in their temperaments and require different proportions of the several ingredients to produce proper temper and the desired effect.

I claim as my invention and desire to secure by Letters Patent of the United States—

1. A composition of matter for the purposes described having gilsonite and lime sludge as the chief ingredients and combined in suitable proportions.

2. A composition of matter for the purposes described containing gilsonite, lime sludge and a suitable oil or flux, combined in suitable proportions.

3. A composition of matter for the purposes described containing gilsonite, lime sludge and asphaltum or an equivalent, combined in suitable proportions, with an oil or flux, either incorporated in the asphaltum or as a separate ingredient.

4. A composition of matter for the purposes described containing gilsonite and lime sludge as the chief ingredients, combined in approximately any of the various proportions stated, according to inclusion or omission of other ingredients.

5. A composition of matter for the purposes described containing gilsonite, lime sludge and asphaltum or an equivalent, combined in suitable proportions, with an oil or flux added in suitable proportion to bring out the desired temperament which varies according to the nature of the asphaltum.

6. A composition of matter for the purposes described containing gilsonite, lime sludge and asphaltum combined in suitable proportions.

7. A composition of matter for the purposes described comprising gilsonite and lime sludge combined in substantially the proportions specified, oil being added for consistency.

In testimony whereof I affix my signature in presence of two witnesses.

EDWARD J. YETTER.

Witnesses:
MARY MCCRADDEN,
EDGAR H. STAPPER.